INVENTOR
JOHN A. PULLIN
BY William R. Piper
ATTORNEY

Aug. 30, 1966         J. A. PULLIN         3,268,995
       CAM SHAFT REAR BEARING REMOVING TOOL WITH AN IMPACT ARBOR AND
               HAVING PLUNGER MEANS TO ENGAGE SAID BEARING
Filed July 6, 1964                              2 Sheets-Sheet 2
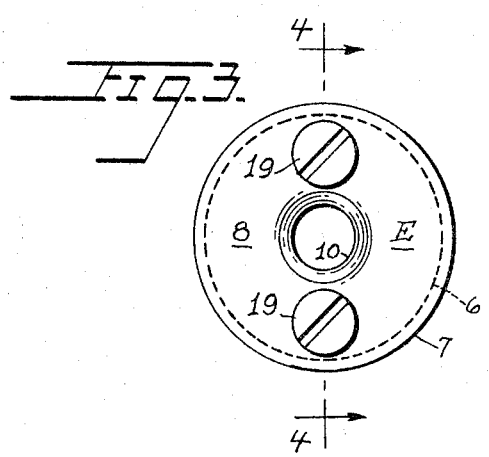
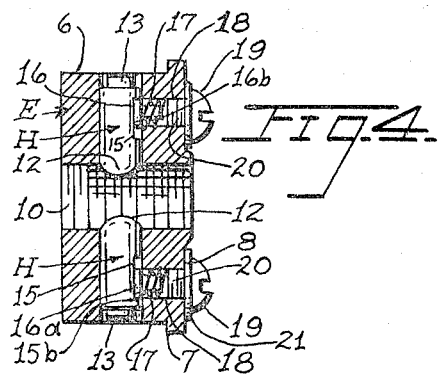
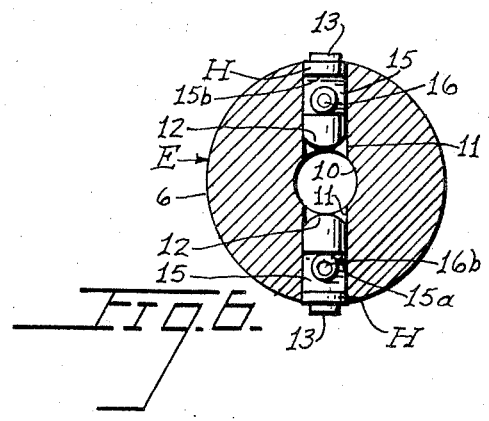
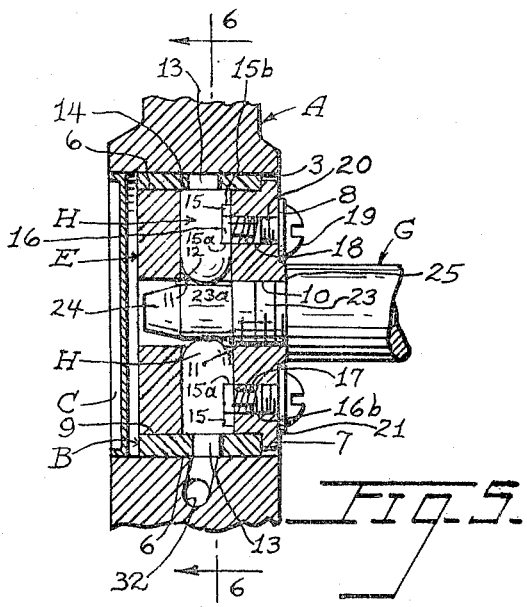
INVENTOR
JOHN A. PULLIN
BY William R. Piper
ATTORNEY United States Patent Office 3,268,995
Patented August 30, 1966

3,268,995
CAM SHAFT REAR BEARING REMOVING TOOL WITH AN IMPACT ARBOR AND HAVING PLUNGER MEANS TO ENGAGE SAID BEARING
John A. Pullin, 110 Fir Ave., San Francisco, Calif.
Filed July 6, 1964, Ser. No. 380,561
4 Claims. (Cl. 29—275)

The present invention relates to improvements in a cam shaft rear bearing remover and it consists in the combination, construction and arrangement of parts as hereinafter described and claimed.

Under the present practice when it is necessary to remove a worn cam shaft rear bearing, the mechanic must first remove the cam shaft and then he must remove the transmission from the engine before he can gain access to the oil seal plug for the rear cam shaft bearing. He then removes the oil seal plug and finally can use a hammer to knock out the cam shaft rear bearing and cause it to fall into the interior of the engine block. It requires about thirteen and one-half hours of work for the mechanic to remove the transmission from the engine in order to gain access to the oil seal plug for removing it. The plug must be removed before the mechanic can gain access to the cam shaft rear bearing from the outside of the engine for hammering the bearing and forcing it into the engine interior.

The principal object of my invention is to provide a cam shaft rear bearing remover that will permit the mechanic to remove the bearing as soon as the cam shaft is removed. It is not necessary to first remove the oil seal plug for the cam shaft rear bearing and therefore it is not necessary to disconnect the transmission from the engine. A great deal of time and expense can therefore be saved.

A further object of my invention is to provide a device of the type described which is simple in construction and durable and efficient for the purpose intended.

Other objects and advantages will appear as the specification continues. The novel features of the invention will be set forth in the appended claims.

Drawings

For a better understanding of my invention reference should be made to the accompanying drawings, forming part of this specification, in which:

FIGURE 1 is a longitudinal section through an engine with the cam shaft removed. This figure shows my cam shaft rear bearing remover connected to the rear cam shaft bearing and also coupled to a slide hammer preparatory to operating the slide hammer for removing the bearing.

FIGURE 2 is an enlarged sectional view of the cam shaft rear bearing shown mounted in the engine and an oil seal plug for the bearing is also shown in elevation. The bearing engaging device of my cam shaft rear bearing remover is illustrated in side elevation and on a larger scale in FIGURE 2 than that shown in FIGURE 1. The bearing engaging device has been inserted into the cam shaft rear bearing and the arbor of my bearing remover has been connected to the bearing engaging device for causing it to engage with the cam shaft rear bearing for removing it.

FIGURE 3 is a front elevation of the bearing engaging device shown in full size.

FIGURE 4 is a longitudinal section through the bearing engaging device and is taken along the line 4—4 of FIGURE 3. The radially extending pins are shown in retracted position in FIGURE 4.

FIGURE 5 is a sectional view similar to FIGURE 4, but shows the radially extending pins moved into their outermost positions by the connection of the arbor with the bearing engaging device. The extended pins are shown engaging with the annular groove in the cam shaft rear bearing.

FIGURE 6 is a transverse section taken along the line 6—6 of FIGURE 5, and shows the rear bearing engaging device.

Detailed description

Figure 1:
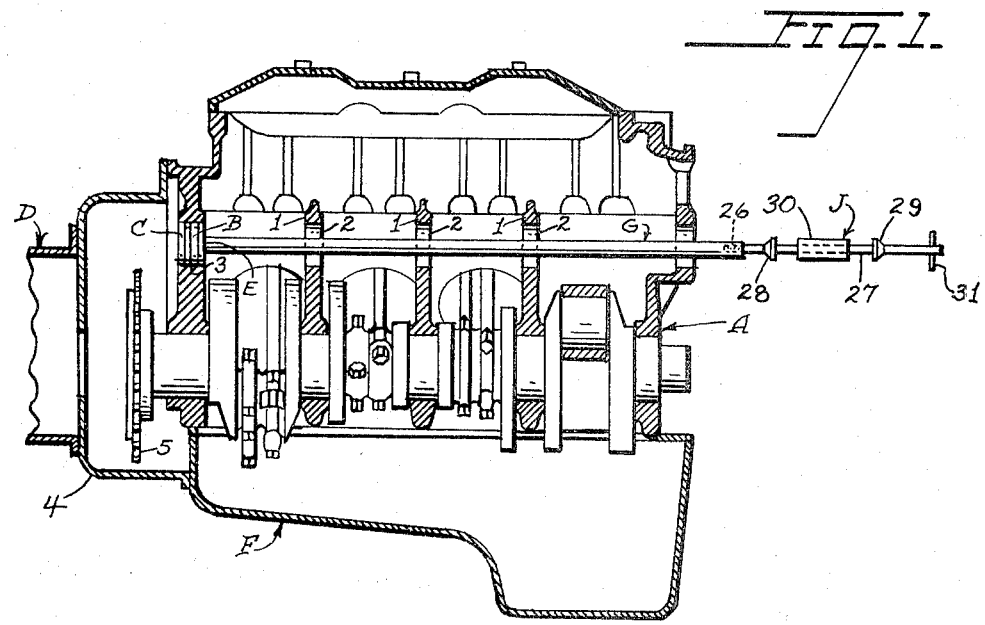

In FIGURE 1, I show a longitudinal section through an engine indicated generally at A. The engine is provided with the usual partitions 1 having bores 2 therein for receiving a cam shaft, not shown. The cam shaft has been removed from the engine illustrated in FIGURE 1, but the engine still contains the cam shaft rear bearing indicated generally at B. Next to the cam shaft rear bearing B, there is mounted an oil seal plug C, see also FIGURE 2. FIGURE 1 further illustrates an automobile transmission indicated generally at D.

The general practice of a mechanic in removing a worn cam shaft bearing B from the bore 3 is to first remove the cam shaft as indicated in FIGURE 1 and then he must remove the automobile transmission D and the casing 4 as well as the gear 5 before he can gain access to the oil seal plug C for removing it. It requires a great deal of time to disconnect the transmission D from the engine A in order to expose the oil seal plug C and remove it. When this is accomplished, the mechanic uses a hammer to knock out the worn cam shaft rear bearing B into the interior of the engine. A new cam shaft rear bearing B is placed in the bore 3 prior to the cam shaft being reinserted into the engine.

Figure 2:
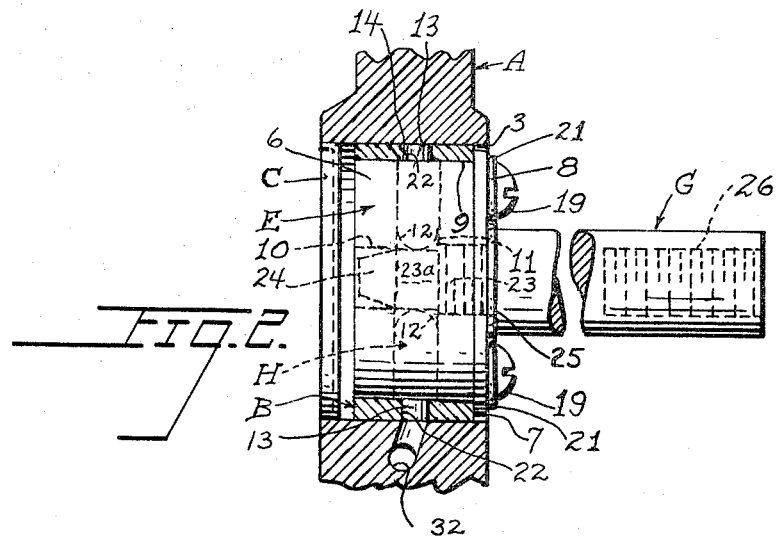

My present cam shaft rear bearing remover does away with the necessity of the mechanic having to disconnect the transmission D from the engine in order to gain access to the oil seal plug C. Instead, I provide a bearing engaging device indicated generally at E that the mechanic places in the worn bearing B. FIGURES 2, 3 and 4 show this rear bearing engaging device as having a body with an outer cylindrical surface 6 and as having an annular flange 7 lying flush with the front face 8 of the body. The outer cylindrical surface 6 has a diameter equal to the inner diameter of the cam shaft rear bearing B. The rear bearing engaging device E can be made of different sizes so as to fit the interior cylindrical surface of the cam shaft rear bearings B of different types.

FIGURES 2 and 5 show the body of the bearing engaging device E as having its outer cylindrical surface 6 contacting with the inner cylindrical surface 9 of the cam shaft rear bearing B. Even though the rear bearing B is worn through use so that its inner surface 9 may not be cylindrical, the body of the bearing engaging device E can still enter the bearing. The outer diameter of the flange 7 is less than the inner diameter of the bore 3, but is greater than the inner diameter of the cylindrical surface 9 of the rear bearing B. Therefore the flange 7 will abut the cylindrical edge of the bearing B when the bearing engaging device E is inserted into the bearing. The mechanic can remove the oil pan F from the bottom of the engine A and this will give him access to the cam shaft rear bearing B and permit him to insert the bearing engaging device E into the rear bearing.

Before describing the special construction of an arbor G that can be inserted through the aligned bores 2 of the engine A and connected to the rear bearing engaging device E, it is best to first describe the detailed structure of the bearing engaging device. FIGURES 4, 5 and 6 show the bearing engaging device E in section. The body of the bearing engaging device has a central threaded bore 10 and radially extending bores 11 communicating with the longitudinal bore 10 and with the outer cylindrical surface 6 of the bearing engaging device E. One or more bores 11 may be used and I have illustrated two radially extending bores in FIGURES 4, 5 and 6 that are disposed 180° apart. Radially extending plungers H are slidably mounted in the bores 11. The plungers have rounded inner ends 12 and have reduced outer cylindrical ends 13 that form annular shoulders 14.

FIGURES 4 and 5 further show the radially extending plungers H provided with receses 15 that have inner end walls 15a and outer end walls 15b. Stop members 16 have their head portions 16a slidably received in the recesses 15. The stop members 16 have reduced cylindrical shanks 16b and these receive the ends of coiled springs 17. The body of the bearing engaging device E has longitudinally extending bores 18 whose axes parallel the axis of the central bore 10 and whose diameters are large enough to receive the coil springs 17. The bores 18 extend at right angles to the bores 11. Cap screws 19 have their threaded shanks 20 threaded into the threaded portions of the bores 18 and the inner ends of the shanks 20 of the cap screws 19 bear against the adjacent ends of the springs 17 so as to compress them and cause them to yieldingly hold the stops 16 against the plungers H. Lock washers 21 are mounted on the shanks 20 of the cap screws 19 and hold them from accidental disengagement from the member E.

FIGURE 4 shows the plungers H in retracted position and the heads 16a of the stops 16 will engage with the outer end walls 15b of the receses 15 in the plungers. When the plungers H are in retracted position, the outer ends of the reduced cylindrical portions 13 will lie flush with the outer cylindrical surface 6 of the bearing engaging device E. This will permit the device E to be inserted into the worn cam shaft rear bearing G.

FIGURE 2 shows the cam shaft rear bearing B provided with oil holes 22 that extend through the wall of the bearing. When the bearing engaging device E is placed in the rear bearing B, the flange 7 will contact with the outer cylindrical end of the bearing and this will align the reduced outer ends 13 of the plungers H with the oil holes 22.

It is best now to describe the particular construction of the arbor G and how it is connected to the bearing engaging device E for moving the plungers outwardly and causing the reduced portions to enter the oil holes 22. The arbor G is shown in FIGURES 2 and 5 and is shown in full lines on a smaller scale in FIGURE 1. The arbor is cylindrical in shape and has a diameter that is less than the diameters of the bores 2 in the engine A. The length of the arbor is such that it will extend from the rear bearing engaging device E and the front end of the arbor will project beyond the front end of the engine A. FIGURE 5 shows the arbor G provided with a reduced cylindrical threaded portion 23, with a slightly reduced smooth cylindrical portion 23a, and with a conical-shaped tip 24. An annular shoulder 25 is formed at the juncture of the reduced cylindrical threaded portion 23 and the main cylindrical body of the arbor. The outer end of the arbor may have a threaded central bore 26, see FIGURE 2.

In FIGURE 1, I show the arbor extending through the aligned bores 2 of the engine A and connected to the bearing engaging device E. The connection is made by inserting the conical tip 24 into the threaded bore 10 of the member E and then rotating the arbor for causing the threaded portion 23 to enter the bore. As the portion 23 moves into the bore the conical end 24 will contact with the rounded inner ends 12 of the plungers H and will force them outwardly as clearly shown in FIGURES 5 and 6. Then the smooth cylindrical reduced portion 23a will contact with the ends 12 of the plungers H. This will cause the reduced portions 13 of the plungers H to enter the oil holes 22 in the cam shaft rear bearing B, but they will not contact with the surface of the bore 3. The shoulder 25 on the arbor G will strike the front face of the bearing engaging member E before the conical end 24 of the arbor will move beyond the left hand end of the bearing remover E in FIGURES 2 and 5. Therefore the conical end 24 cannot contact the oil seal plug C. In this way the oil seal plug will not be disturbed.

Any means for moving the arbor G to the right in FIGURE 1 to remove the cam shaft rear bearing B may be used. In FIGURE 1, I show a slide hammer indicated generally at J connected to the arbor. This device has a shank 27 that is threaded and is removably received in the threaded bore 26 in the arbor G. The shank 27 has two spaced apart stops 28 and 29 thereon and a sleeve or hammer 30 is slidably mounted on the shank and can be reciprocated between the stops 28 and 29. A handle 31 is mounted at the outer end of the shank 27.

The machinist can reciprocate the hammer sleeve 30 so as to strike the stop 29 and urge the slide hammer J and the arbor G to the right in FIGURE 1. The reduced portions 13 on the plungers H will urge the cam shaft rear bearing B to the right in the bore 3 and the plungers will contact with the walls of the oil holes 22 and will move the bearing in the direction of its longitudinal axis without any tendency for the plungers to press outwardly and increase the diameter of the bearing so as to urge it against the wall of the bore 3. The reciprocation of the sleeve 30 on the slide hammer J will dislodge and remove the cam shaft rear bearing B as the machinist pulls outwardly on the handle 31 of the slide hammer. It has not been necessary to first remove the oil seal plug C and therefore it has not been necessary to disconnect the transmission D from the engine A. A great deal of time is thereby saved.

After the worn cam shaft rear bearing B has been removed, a new one can be placed in the bore 3 and then the cam shaft, not shown, can be reinserted through the aligned bores 2 and have its end received in the new cam shaft rear bearing B.

FIGURES 2 and 5 show the oil holes 22 communicating with an oil feeding passageway 32 in the engine. The central bore 10 in the bearing remover E need have a threaded portion only from the front face 8 to the radially extending bores 11 because the slightly reduced smooth cylindrical portion 23a and the conical end 24 are received in the remainder of the bore 10 that extends from the radial bores 11 to the left hand end of the body of the member E shown in FIGURES 2 and 5.

I claim:
1. A cam shaft rear bearing remover comprising:
 (a) a rear bearing gripping member having a cylindrical body adapted to be removably received in a cylindrical cam shaft rear bearing that has oil holes in its cylindrical wall;
 (b) said member having an annular flange adjacent to its front face and adapted to contact with the adjacent edge of said bearing when said cylindrical body is received in said bearing;
 (c) radially extending plungers slidably carried by said cylindrical body and adapted to have their outer ends moved into the oil holes in said bearing;
 (d) said cylindrical body having an axially aligned threaded bore; and
 (e) an elongated arbor having a length greater than the distance from said rear bearing to the front of an engine in which said bearing is mounted;
 (f) said arbor having a reduced threaded portion adapted to be received in the threaded portion with a conical outer end for contacting with the inner ends of said plungers for moving them outwardly and causing them to enter the oil holes; the outer end of said arbor projecting beyond the front of the engine.

2. The combination as set forth in claim 1: and in which
 (a) the reduced threaded portion of said arbor forms a shoulder with the main body of the arbor; the shoulder on said arbor striking the front face of said cylindrical member for stopping further movement of said conical outer end before it extends beyond the end of the axially aligned bore.

3. The combination as set forth in claim 1: and in which
   (a) means is carried by said cylindrical member for limiting the outward and inward movements of said plungers in said member.
4. The combination as set forth in claim 2: and in which
   (a) the outer end of said arbor has a centrally disposed and longitudinally extending threaded cylindrical recess.

References Cited by the Examiner
UNITED STATES PATENTS

| | | | |
|---|---|---|---|
| 1,513,031 | 9/1924 | Brown | 29—260 X |
| 1,759,285 | 5/1930 | Sease | 29—275 |
| 2,497,498 | 2/1950 | Hamilton | 29—275 X |
| 3,142,899 | 8/1964 | Meyer | 29—275 |

WILLIAM FELDMAN, *Primary Examiner.*

M. C. KRUSE, *Assistant Examiner.*